(12) United States Patent
Yang

(10) Patent No.: US 6,977,823 B2
(45) Date of Patent: Dec. 20, 2005

(54) SWITCH POWER SUPPLY APPARATUS

(76) Inventor: Lee-Lung Yang, 5F-1, No. 28, Tai Yuen St., Chu Pei City, Hsin Chu Hsien (TW) 302

( * ) Notice: Subject to any disclaimer, the term of this patent is extended or adjusted under 35 U.S.C. 154(b) by 85 days.

(21) Appl. No.: 10/694,351

(22) Filed: Oct. 28, 2003

(65) Prior Publication Data

US 2005/0088857 A1    Apr. 28, 2005

(51) Int. Cl.$^7$ .............................................. H02M 3/335
(52) U.S. Cl. .................. 363/17; 363/21.04; 363/21.12; 363/132
(58) Field of Search ......................... 363/17, 20, 21.01, 363/21.04, 21.05, 21.12, 21.13, 22, 95, 97, 363/98, 131, 132

(56) References Cited

U.S. PATENT DOCUMENTS

| | | | | |
|---|---|---|---|---|
| 5,317,498 | A | * | 5/1994 | Dhyandchand et al. ....... 363/43 |
| 5,710,697 | A | * | 1/1998 | Cooke et al. ............ 363/21.11 |
| 5,742,496 | A | * | 4/1998 | Tsutsumi ...................... 363/95 |
| 5,815,384 | A | * | 9/1998 | Hammond et al. ........... 363/26 |

* cited by examiner

*Primary Examiner*—Adolf Berhane

(57) ABSTRACT

The present invention provides a power supply apparatus with a plurality of digital control units. Each digital control unit is used to control an independent output terminal for outputting a stable output voltage. The output voltage is not fed back to the primary side of the transformer.

16 Claims, 5 Drawing Sheets

FIG. 3A CLK

FIG. 3B $V_{fef}$ $V_{out}$

SWITCH POWER SUPPLY APPARATUS

FIELD OF THE INVENTION

The present invention relates to a power supply circuit, and more particularly to a power supply using a digital control method.

BACKGROUND OF THE INVENTION

Switching power supplies used as power supplies for operating circuits of electronic units are classified as isolating-type and non-isolating-type switching power supplies. In the case of an isolating-type switching power supply, the switching power supply comprises an input circuit including a first coil on the primary side of a transformer as an input side and an output circuit including a second coil magnetically coupled with the first coil through a core, on the secondary side as an output side.

The input circuit includes the first coil, a DC power supply, a switch device, and a control circuit.

A current supplied from the DC power supply to the first coil flows intermittently by means of ON/OFF control of the switch device performed by the control circuit. As a result, an AC voltage is generated in the second coil, which is magnetically coupled with the first coil. This AC voltage is extracted as a DC output voltage by a rectifying circuit and a smoothing circuit provided for the output circuit, and supplied to a load.

A pulse-width-modulation IC (hereinafter called a PWM IC) is usually used for the control circuit. The PWM IC is basically formed of an error amplifier, a triangular-wave generator, and a comparator.

An output voltage $V_{out}$ from the output circuit is fed back to the inverted input terminal of the error amplifier and a constant reference voltage is applied to the non-inverted input terminal. The triangular-wave generator outputs, for example, a fundamental triangular wave having a frequency of 20 kHz to 2 MHz. The fundamental triangular wave is input to the inverted input terminal of the comparator and an amplified voltage $V_{amp}$ amplified by the error amplifier is input to the non-inverted input terminal. The comparator compares the fundamental triangular wave with the amplified voltage $V_{amp}$ and generates a driving pulse for ON-control of the switch device during the period when the fundamental triangular wave is larger than the amplified voltage $V_{amp}$. Therefore, as shown in FIGS. 1A to 1C, when the amplified voltage $V_{amp1}$ is large, the pulse width of the driving pulse becomes small, and when the amplified voltage $V_{amp2}$ is small, the pulse width of the driving pulse becomes large. As a result, the ON period of the switch device is varied and pulse-width-modulation control is constantly applied to the output voltage $V_{out}$ from the output circuit. However, the conventional PWM control method can only feed back one output voltage to the PWM IC. In other words, it can only assure output of one stable output voltage. Therefore, the conventional PWM control method does not suit a switching power supply requiring a plurality of output voltages.

On the other hand, the use of "resonant" switching techniques has been employed in the art to reduce or eliminate the switching losses caused by high switching frequencies. Resonant switching techniques generally comprise the inclusion of an LC subcircuit in series with a semiconductor switch which, when turned ON, creates a resonating subcircuit within the converter. Timing the ON/OFF control cycles of the resonant switch to correspond with particular voltage and current conditions across respective converter components during the switching cycle inherently reduces or eliminates many frequency-dependent switching losses. However, the ON/OFF switch may cause a high magnitude current in the transformer, which can reduce the transferring efficiency.

SUMMARY OF THE INVENTION

According to the above descriptions, the conventional PWM control method does not suit this switching power supply requiring a plurality of output voltage. On the other hand, using resonant switching techniques in the switching power supply generally causes a high magnitude current in the transformer, which can reduce the transferring efficiency.

Therefore, the main object of the present invention is to provide a switching power supply using a digital control method. Accordingly, the control method of the present invention uses an independent control unit to control each output voltage. Therefore, the present invention can achieve a stable regulation.

Another object of the present invention is to provide a switching power supply using a digital control method. Accordingly, the present invention uses independent control units in the output terminal. The output voltage does is not fed back to the primary side of the transformer. In other words, the magnitude in the transformer does not disappear. Therefore, the control method of the present invention does not generate an inrush magnitude current to reduce the power transferring efficiency.

Yet another object of the present invention is to provide a switching power supply apparatus with a plurality of digital control units. Accordingly, each digital control unit is used to control an independent output terminal. Therefore, this switching power supply apparatus can provide stable output voltage in each output terminal.

Yet another object of the present invention is to provide a switching power supply apparatus with a plurality of digital control units. Accordingly, the output signal is not fed back to the input terminal to turn on/off the primary side of the transformer. Therefore, the inrush magnitude current due to the ON/OFF switch is not generated in this apparatus.

The present invention provides a power supply apparatus using a digital control method. This power supply apparatus has a plurality of digital control units. Each digital control unit is used to control an independent output terminal for outputting a stable output voltage. The output voltage is not fed back to the primary side of the transformer. In other words, the change of the output voltage value does not affect the supplied power from the primary side. Therefore, the primary side is completely isolated from the secondary side.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 3A to 3D respectively illustrate the switching control signal of the switching power supply apparatus using a digital control method according to the present invention.

DETAILED DESCRIPTION OF THE PREFERRED EMBODIMENT

Without limiting the spirit and scope of the present invention, the switching power supply apparatus and control method thereof proposed in the present invention is illustrated with one preferred embodiment. One of ordinary skill in the art, upon acknowledging the embodiment, can apply the switching power supply structure of the present invention to various power supply apparatus. Accordingly, the power supply structure the present invention has a plurality of digital control units. Each digital control unit is used to control an independent output terminal. Therefore, this structure can provide a stable output voltage in each output terminal. Moreover, the output signal is not fed back to the input terminal to turn on/off the primary side of the transformer. Therefore, the inrush magnitude current due to the ON/OFF switch is not generated in this apparatus.

On the other hand, the present invention also provides a control method that uses an independent control unit in the output terminal to control the output voltage. The output signal is not fed back to the input terminal to control the output power of the primary side of the transformer. In other words, even though no load is connected to the power supply apparatus, the control of the primary side of the transformer is not affected. Therefore, an inrush magnitude current is not generated and power-transferring efficiency is raised.

Figure 1A:
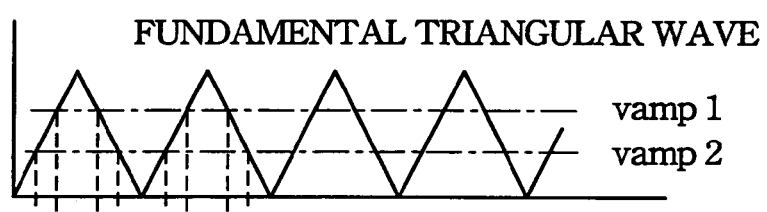
FIG. 1A illustrates a waveform of a triangular waveform generated in a PWM IC.
Figure 1B:
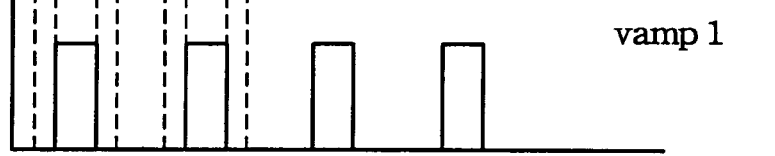
FIGS. 1B to 1C respectively illustrate waveforms output from the PWM IC as a drive pulse in the case where the amplified output voltages $V_{amp1}$ and $V_{amp2}$ are input.
Figure 1C:
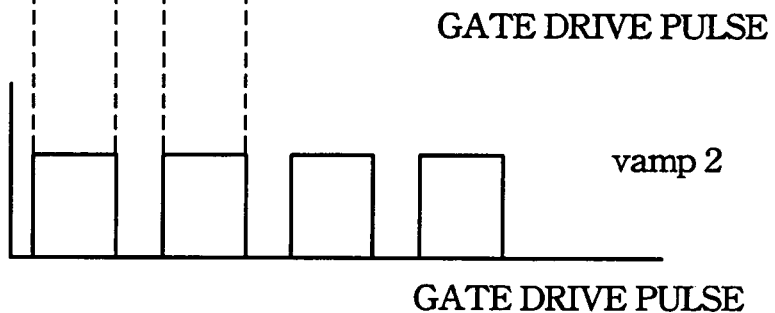
Figure 2:
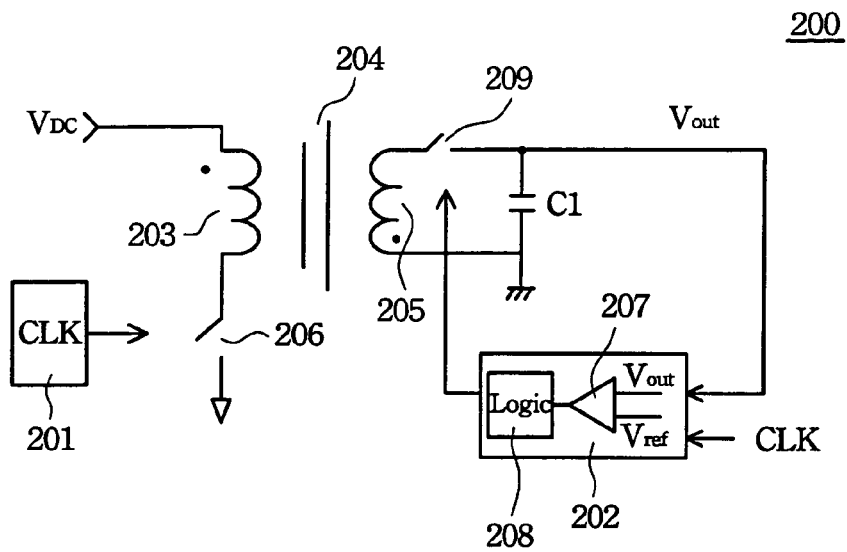
FIG. 2 illustrates a schematic diagram of a switching power supply using a digital control method according to the present invention, wherein a flyback-type is adopted in the switching power supply framework.

FIG. 2 illustrates a schematic diagram of a switching power supply using a digital control method according to the present invention, wherein a flyback-type is adopted in the switching power supply framework. It is noted that Forward-type, Push-pull-type, Half-bridge-type or Full-bridge-type can also be used in the switching power supply framework. FIG. 5 to FIG. 8 illustrate the witching power supply framework of Forward-type, Push-pull-type, Half-bridge-type and Full-ridge-type according to the present invention respectively.

According to the preferred embodiment, the power supply apparatus 200 of the present invention is configured for supplying regulated DC power from a voltage source $V_{DC}$ to an output voltage terminal $V_{out}$. The power supply apparatus 200 comprises a single transformer T, which isolates the voltage source $V_{DC}$ from the output voltage terminals $V_{out}$. An IC circuit 201 is used to generate a CLK signal with a special frequency and a special duty cycle. The CLK signal is used to switch the switching element 206. Therefore, the $V_{DC}$ input voltage is intermittently applied to a first winding 203 of a transformer 204 through a special frequency switching action of the switching element 206, so that an AC voltage induced in a secondary winding 205 of the transformer 204 is rectified by a capacitor C1 to thereby obtain a DC output voltage $V_{out}$.

An IC circuit 202 is provided on the secondary side of the transformer 204 so that the switching element 209 is turned on or off synchronously with the switching action of the switching element 206. The IC circuit 202 is basically formed of a comparator 207 and a logic circuit 208 to control the ON/OFF of the switching element 209 to modify the output voltage $V_{out}$. The output voltage $V_{out}$ is not fed back to the primary side of the transformer 204. In other words, the secondary side of the transformer 204 uses an independent IC circuit 202 to control a switching element 209 to modify the output voltage $V_{out}$.

The output voltage $V_{out}$ is fed back to the IC circuit 202 in which the output voltage $V_{out}$ is compared with a reference voltage $V_{ref}$ by a comparator 207. The comparator 207 compares the output voltage $V_{out}$ with the reference voltage $V_{ref}$ and generates a driving signal to switch the switching element 209. The switching element 209 is turned on or off synchronously with the CLK signal.

Operation of the switching power supply apparatus of the present invention when supplying a output voltage $V_{out}$ to the single output terminal is best demonstrated in conjunction with the switching control signals and current waveforms illustrated in FIG. 3A to FIG. 3D.

FIG. 3A illustrates a CLK signal generated by the IC circuit 201. The CLK signal is used to turn On or Off the switching element 206 according to frequency of the CLK signal.

FIG. 3B illustrates the output voltage $V_{out}$ and the constant reference voltage $V_{ref}$, wherein the output voltage $V_{out}$ makes the output voltage $V_{out}$ less than a special value. For example, in the preferred embodiment, the output voltage $V_{out}$ is limited to less than the reference voltage $V_{ref}$. Once the output voltage $V_{out}$ is larger than the reference voltage $V_{ref}$, the IC circuit 202 can control the switching element 209 to turn off to push down the output voltage.

Figures 3C, 3D:
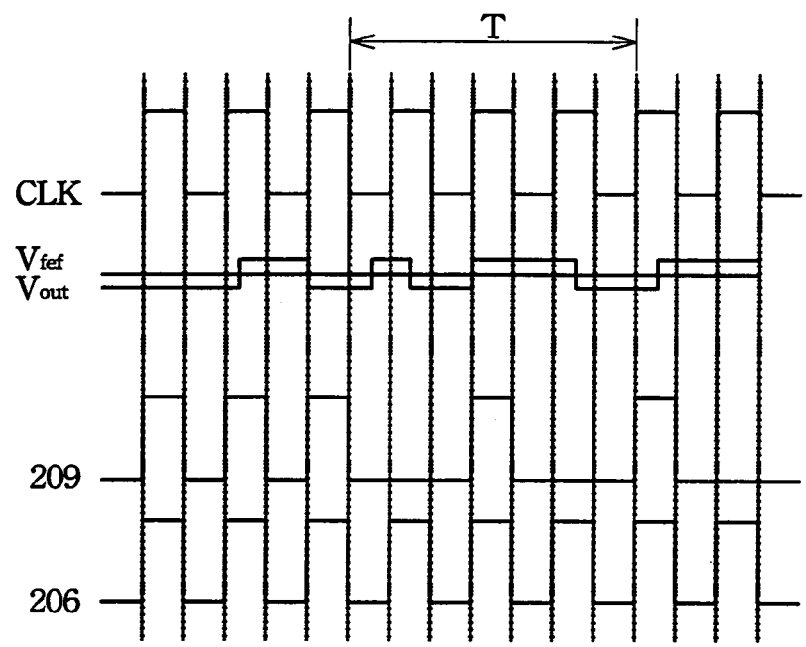
Figure 5:
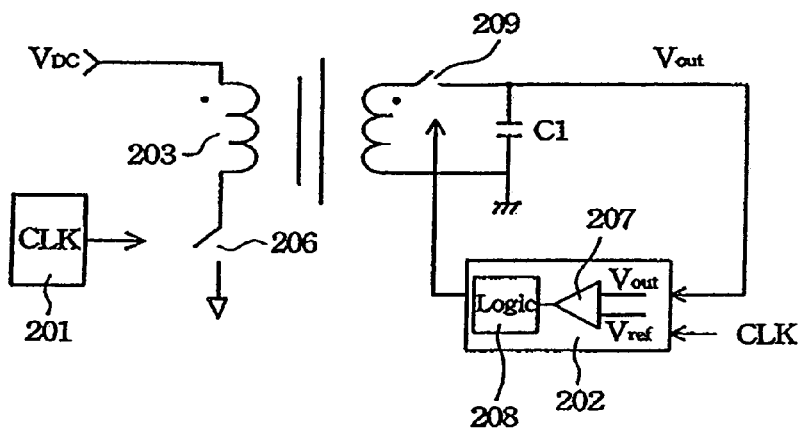
FIG. 5 illustrates a schematic diagram of a switching power supply using a digital control method according to the present invention, wherein a Forward-type is adopted in the switching power supply framework.
Figure 6:
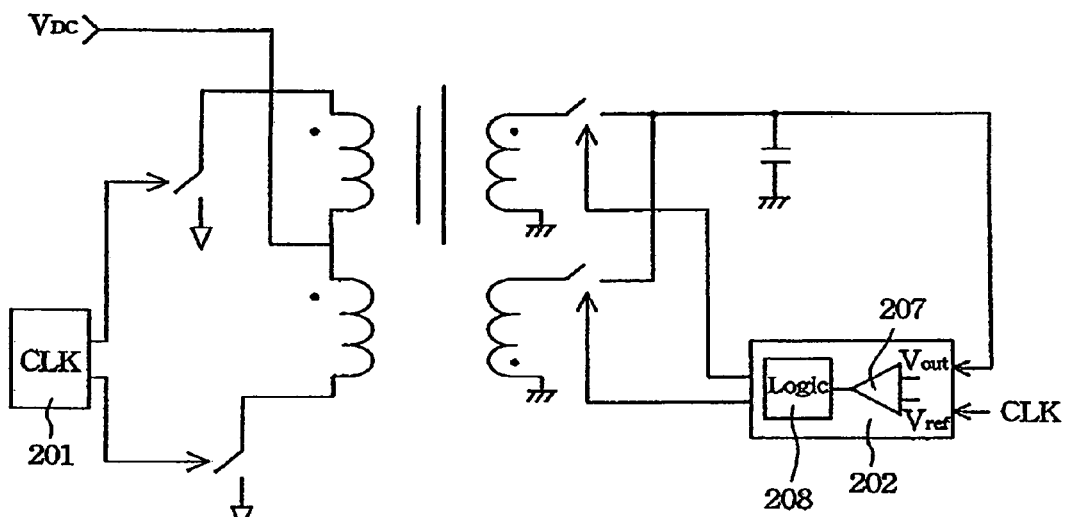
FIG. 6 illustrates a schematic diagram of a switching power supply using a digital control method according to the present invention, wherein a Push-pull-type is adopted in the switching power supply framework.
Figure 7:
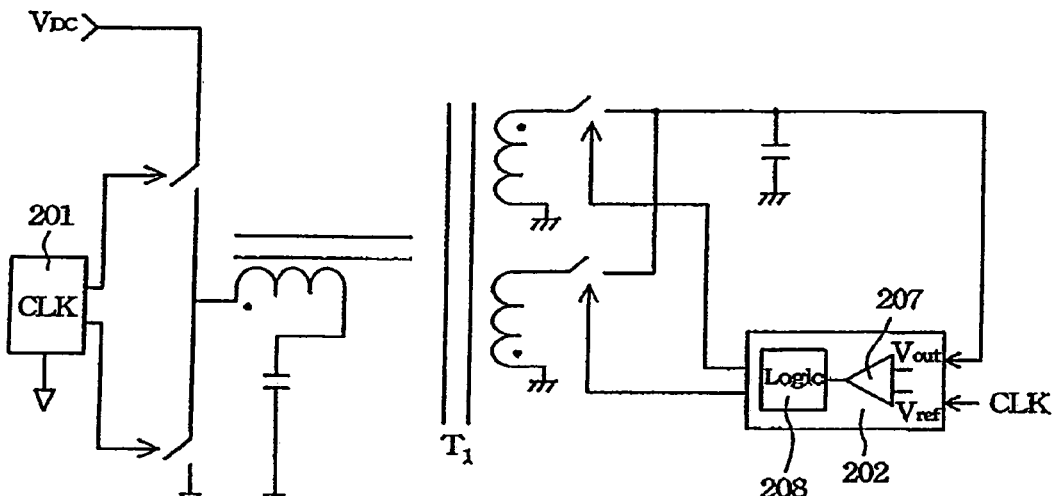
FIG. 7 illustrates a schematic diagram of a switching power supply using a digital control method according to the present invention, wherein a Half-bridge-type is adopted in the switching power supply framework.
Figure 8:
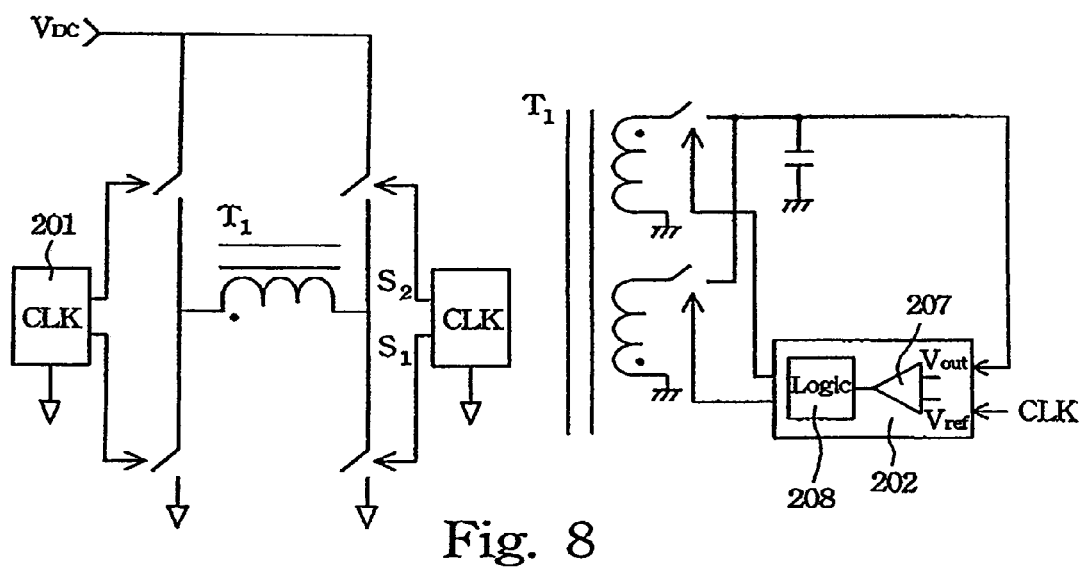
FIG. 8 illustrates a schematic diagram of a switching power supply using a digital control method according to the present invention, wherein a Full-bridge-type is adopted in the switching power supply framework.

FIG. 3C illustrates the switching signals applied to the switching element 209. When the output voltage $V_{out}$ is larger than the reference voltage $V_{ref}$ as shown in time zone T of the FIG. 3B, the turn on time of the switching element 209 is modified to push down the output voltage $V_{out}$. For example, the switching signals applied to the switching element 209 are kept at a low level when the output voltage $V_{out}$ is larger than the reference voltage $V_{ref}$. At this time, the switching element 209 is not turned on. When switching element 209 is Off, the energy stored in the transformer 204 is not transferred to the output terminal. In other words, the output terminal is isolated by the secondary side of the transformer 204. The secondary side of the transformer 204 stops supplying power to the output terminal. Therefore, the output voltage $V_{out}$ is pushed down. It is noted that the switching signal applied to the switching element 209 is synchronous with the CLK signal.

FIG. 3D illustrates the switching signals applied to the switching element 206. The switching signal applied to the switching element 206 is synchronous with the CLK signal.

Figure 4:
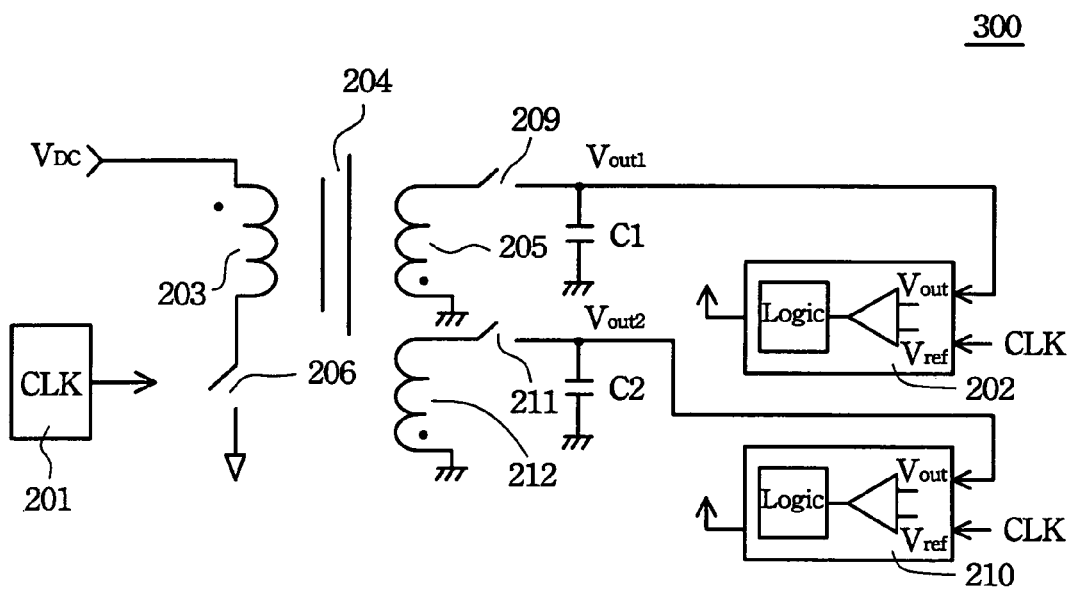
FIG. 4 illustrates a schematic diagram of a switching power supply with a plurality of digital control units according to the present invention.

FIG. 4 illustrates a schematic diagram of a switching power supply using a plurality of digital control units to control the output voltages according to the present invention, wherein a flyback-type is adopted in the switching power supply framework. It is noted that Forward-type, Push-pull-type, Half-bridge-type or Full-bridge-type can also be used in the switching power supply framework.

According to the preferred embodiment, this power supply apparatus 300 of the present invention is configured for supplying regulated DC power from a voltage source $V_{DC}$ to two output terminals. The power supply apparatus 300 comprises a single transformer T, which isolates the voltage source $V_{DC}$ from the output voltage terminals. An IC circuit 201 is used to generate a CLK signal with a special frequency and a special duty cycle. The CLK signal is used to switch the switching element 206. Therefore, the $V_{DC}$ input voltage is intermittently applied to a first winding 203 of a transformer 204 through a special frequency switching action of the switching element 206, so that an AC voltage is induced in two secondary windings 205 and 212 of the transformer 204.

Two IC circuits 202 and 210 are provided on the secondary side of the transformer 204 for outputting switching signals to respectively turn On/Off the switching elements 209 and 211. The switching signals are synchronous with the CLK signal. Therefore, the switching elements 209 and 211 are turned on or off synchronously with the switching action of the switching element 206. The IC circuits 202 and 210 are respectively basically formed of a comparator 207 and a logic circuit 208 to control the ON/OFF of the switching element 209 and 211 to modify the output voltage $V_{out}$. According to this preferred embodiment, both the output voltages $V_{out1}$ and $V_{out2}$ are not fed back to the primary side of the transformer 204. Therefore, the secondary side of the transformer 204 is completely isolated from the primary side of the transformer 204. In other words, the output voltage in the output terminals does not affect the primary side of the transformer 204. The secondary side of the transformer 204 uses two independent IC circuits 202 and 210 to modify the output voltage $V_{out}$.

The output voltage $V_{out1}$ and $V_{out2}$ are respectively fed back to the IC circuits 202 and 210 for modulating the On/Off of the switching elements 209 and 211. Both the output voltage $V_{out1}$ and $V_{out2}$ are compared with a reference voltage $V_{ref}$ by a comparator 207 for generating driving signals to switch the switching element 209 and 211.

For example, when the output voltage $V_{out1}$ is larger than the reference voltage $V_{ref}$, the switching signal applied to the switching element 209 is kept at a low level. At this time, the energy stored in the transformer 204 is not transferred to the output terminal. Therefore, the output voltage $V_{out1}$ is pushed down. Similarly, the same method can be used to modify the output voltage $V_{out2}$.

Accordingly, the power supply apparatus of the present invention uses independent control units to control each independent output terminal. Therefore, the present invention can achieve a stable regulation. On the other hand, switching power supply apparatus with a plurality of digital control units can be employed. Each digital control unit is used to control an independent output terminal. The output signal is not fed back to the input terminal to turn on/off the primary side of the transformer. Therefore, the inrush magnitude current due to the ON/OFF switch is not generated in this apparatus.

As is understood by a person skilled in the art, the foregoing preferred embodiments of the present invention are illustrative of the present invention rather than limiting of the present invention. It is intended that this description cover various modifications and similar arrangements included within the spirit and scope of the appended claims, the scope of which should be accorded the broadest interpretation so as to encompass all such modifications and similar structure.

What is claimed is:

1. A switching power supply apparatus for supplying power from an input voltage source to one output terminal for generating an output voltage, said apparatus comprising:
   a transformer, isolating said output terminal from said input voltage source, said transformer having a first winding and a second winding;
   a first switching element connecting with said first winding;
   a CLK signal generator for generating a CLK signal to switch said first switching element according said CLK signal, wherein said CLK signal generator does not receive said output voltage to change said CLK signal;
   a second switching element connecting with said second winding; and
   a control unit for receiving said output voltage to generate a switching signal to switch said second switching element, wherein said switching signal is synchronous with said CLK signal.

2. The switching power supply apparatus according to claim 1, wherein said switching power supply apparatus is designed as a Flyback-type, Forward-type, Push-pull-type, Half-bridge-type or Full-bridge-type.

3. The switching power supply apparatus according to claim 1, wherein said control unit further comprises a comparator and a logic circuit.

4. The switching power supply apparatus according to claim 3, wherein said comparator is used to compare said output voltage with a constant reference voltage.

5. The switching power supply apparatus according to claim 3, wherein said logic circuit is used to output a switching signal to switch said second switching element according to a comparison result.

6. The switching power supply apparatus according to claim 3, wherein when said output voltage is larger than said reference voltage, said control unit controls said second switching element to cut off an electrical connection between said second winding and said output terminal.

7. A switching power supply apparatus for supplying power from an input voltage source to a plurality output terminals for generating a plurality of output voltages, said apparatus comprising:
   a transformer, isolating said output terminals from said input voltage source, said transformer having a first winding and a plurality of second windings;
   a first switching element connecting with said first winding;
   a CLK signal generator for generating a CLK signal to switch said first switching element according said CLK signal, wherein said CLK signal generator does not receive said output voltage to change said CLK signal;
   a plurality of second switching elements for connecting with said second windings, wherein each second switching element connects to one corresponding second winding; and
   a plurality of control units, wherein each control unit receives a corresponding output voltage to generate a switching signal to switch corresponding second switching element, wherein said switching signal is synchronous with said CLK signal.

8. The switching power supply apparatus according to claim 7, wherein said switching power supply apparatus is designed as a Flyback-type, Forward-type, Push-pull-type, Half-bridge-type or Full-bridge-type.

9. The switching power supply apparatus according to claim 7, wherein each control unit further comprises a comparator and a logic circuit.

10. The switching power supply apparatus according to claim 9, wherein said comparator is used to compare said output voltage with a constant reference voltage.

11. The switching power supply apparatus according to claim 9, wherein said logic circuit is used to output a switching signal to switch said second switching element according to a comparison result.

12. The switching power supply apparatus according to claim 9, wherein when said output voltage is larger than said reference voltage, said control unit controls said second switching element to cut off an electrical connection between said second winding and said output terminal.

13. A switching power supply control method, said switching power supply comprises a transformer having a first winding and a second winding for transferring an input voltage to an output voltage, said method comprising:

switching an energy stored in said first winding according to a CLK signal, wherein said output voltage does not change said CLK signal;

receiving said output voltage to generate a switching signal, wherein said switching signal is synchronous with said CLK signal; and switching an energy stored in said second winding according to said switching signal.

14. The switching power supply control method according to claim 13, wherein said switching power supply apparatus is designed as a Flyback-type, Forward-type, Push-pull-type, Half-bridge-type or Full-bridge-type.

15. The switching power supply control method according to claim 13, wherein receiving said output voltage to generate a switching signal further comprises comparing said output voltage with a constant reference voltage.

16. The switching power supply control method according to claim 15, wherein when said output voltage is larger than said reference voltage, said switching signal stops said second winding from outputting power.

* * * * *